US011644625B2

(12) United States Patent
Filion et al.

(10) Patent No.: US 11,644,625 B2
(45) Date of Patent: May 9, 2023

(54) ADAPTER TIP AND MICROSCOPE SYSTEM FOR INSPECTION OF FIBER-OPTIC CONNECTOR ENDFACES

(71) Applicant: EXFO Inc., Quebec (CA)

(72) Inventors: Jean Filion, Quebec (CA); Olivier Cote, Quebec (CA)

(73) Assignee: EXFO Inc., Quebec (CA)

( * ) Notice: Subject to any disclaimer, the term of this patent is extended or adjusted under 35 U.S.C. 154(b) by 114 days.

(21) Appl. No.: 17/443,496

(22) Filed: Jul. 27, 2021

(65) Prior Publication Data

US 2022/0035104 A1 Feb. 3, 2022

Related U.S. Application Data

(60) Provisional application No. 63/059,209, filed on Jul. 31, 2020.

(51) Int. Cl.
*G02B 6/38* (2006.01)
*G02B 21/00* (2006.01)

(52) U.S. Cl.
CPC .......... *G02B 6/3825* (2013.01); *G02B 6/385* (2013.01); *G02B 6/3853* (2013.01); *G02B 21/0016* (2013.01)

(58) Field of Classification Search
CPC ...... G02B 6/38; G02B 6/3825; G02B 6/3853; G02B 6/385; G02B 21/0016
See application file for complete search history.

(56) References Cited

U.S. PATENT DOCUMENTS

| 6,215,924 | B1 | 4/2001 | Hulse et al. |
| 7,356,236 | B1 | 4/2008 | Huang et al. |
| 8,164,744 | B2 | 4/2012 | Narum et al. |
| 8,976,345 | B2 | 3/2015 | Zhou et al. |
| 9,880,359 | B2 | 1/2018 | Morin-Drouin et al. |
| 2003/0179447 | A1 | 9/2003 | Cassady |
| 2007/0097499 | A1* | 5/2007 | Liao ............ G02B 23/02 359/399 |
| 2010/0201806 | A1* | 8/2010 | Nygaard ........ G01B 11/2433 356/243.1 |
| 2014/0327735 | A1 | 11/2014 | Ruchet et al. |
| 2014/0354977 | A1 | 12/2014 | Zhou et al. |
| 2016/0341904 | A1* | 11/2016 | Morin-Drouin ... G01M 11/31 |
| 2017/0003195 | A1* | 1/2017 | Lafrance .......... G02B 6/3885 |
| 2022/0035104 | A1* | 2/2022 | Filion ............. G02B 6/3853 |

FOREIGN PATENT DOCUMENTS

| FR | 2337326 | A1 | 7/1977 |
| WO | 2013097041 | A1 | 7/2013 |

* cited by examiner

*Primary Examiner* — Tina M Wong
(74) *Attorney, Agent, or Firm* — Helene Chotard (57) ABSTRACT

There is provided an adapter tip to be employed with an optical-fiber connector endface inspection microscope and an optical-fiber connector endface inspection microscope system suitable for imaging the optical-fiber endface of an angled-polished optical-fiber connector deeply recessed within a connector adapter. The adapter tip or microscope system comprises a relay optical system comprising a Rhomboid prism. The Rhomboid prism being disposed so as to receive light reflected from said optical-fiber endface during inspection and laterally shift the light beam reflected from the angled-polished optical-fiber endface.

20 Claims, 12 Drawing Sheets

SECTION C-C

ADAPTER TIP AND MICROSCOPE SYSTEM FOR INSPECTION OF FIBER-OPTIC CONNECTOR ENDFACES

TECHNICAL FIELD

The present description generally relates to inspection of optical-fiber connector endfaces and more specifically to adapter tips, to be used in conjunction with an optical-fiber connector endface inspection microscope and suitable for imaging angled-polished optical-fiber connectors.

BACKGROUND

The quality and cleanliness of endfaces of optical-fiber connectors represent important factors for achieving adequate system performance of optical communication networks. Indeed, any contamination of or damage on the mating surface of an optical-fiber connector may severely degrade signal integrity. Optical-fiber connector endface inspection microscopes are commonly employed to visually inspect and/or to analyze the optical-fiber endface of an optical-fiber connector at installation or during maintenance of optical communication networks, in order to verify the quality of the optical-fiber connection.

Because of the wide variety of optical-fiber connector types deployed in the telecommunication industry, inspection microscopes are typically employed with interchangeable adapter tips so as to allow inspection of various types of optical-fiber connectors directly or as inserted in an optical-fiber connector adapter.

In order to appropriately image the optical-fiber endface, illumination light reflected from the endface should be appropriately collected by the inspection microscope. This typically necessitates that the imaging axis of the inspection microscope system be aligned perpendicularly to the inspected endface. However, this alignment can become impractical when inspecting an angled-polished physical-contact (APC) optical-fiber endface that is deeply recessed within an optical-fiber connector adapter, especially when it is long and narrow. An example of such a recessed endface is that of the Mini Duplex Connector (MDC) developed by US Conec and Corning, and available in APC format (MDC-APC connector), and most specifically its corresponding connector adapter. Other examples include the E2000/APC connector and its corresponding connector adapter, as defined by international Standard associations (see IEC 61754-15:2009/COR1:2014 and TIA-604-16).

Some fiber inspection adapter tips exist in the art for imaging deeply recessed APC connector endfaces. For example, U.S. Pat. No. 8,976,345 to ZHOU et al. describes a fiber inspection adapter tip using a lens or lens system within the tip. The tip lens or lens system is tilted relative to the inspected angled-polished optical-fiber endface, i.e., the lens axis is not normal to the optical-fiber endface. The inspection microscope is also tilted relative to both the tip lens or lens system and the optical-fiber endface. Also, U.S. Pat. No. 9,880,359 to Morin-Drouin et al. describes a fiber inspection adapter tip using at least one relay lens within the tip. The lens axis of the relay lens is offset relative to the optical-fiber endface so as to deviate light reflected from the optical-fiber endface, towards the optical-fiber axis of the connector.

Although there exist fiber inspection adapter tips in the art adapted to image deeply recessed APC connector endfaces, there is still room for alternative solutions and improvements which may allow inspection of even smaller and more recessed APC connectors and adaptors.

SUMMARY

There is provided an adapter tip to be employed with an optical-fiber connector-endface inspection microscope and an optical-fiber connector endface inspection microscope system suitable for imaging and/or analyzing the optical-fiber endface of an angled-polished optical-fiber connector recessed within a connector adapter. Because of the angle formed between the normal of the optical-fiber endface and the optical-fiber axis of the connector (which coincides with the central axis of the connector ferrule), the object plane to be imaged is oriented at an angle (of 8 degrees in the case of APC connectors in the industry) relative to the central axis of the narrow channel formed within the connector adapter. The adapter tip or microscope system comprises a relay optical system comprising a Rhomboid prism which function is to laterally shift light coming from the optical-fiber endface through reflection of the illumination light (mostly specular but also potentially diffuse)—referred to hereinafter as the object beam—in order to allow it to exit the connector adapter and be collected by the inspection microscope.

The relay optical system prevents a substantial proportion of the object beam to be obstructed by the inside walls of the connector adapter and therefore allows a more substantial portion of the object beam reflected from the optical-fiber endface to exit the connector adapter and be collected by the inspection microscope.

The relay optical system may also allow the inspection microscope to be mostly aligned and parallel with the inspected optical-fiber connector. When performing optical-fiber connector inspection on high density patchpanel for example, this alignment minimizes interference of the inspection microscope with neighboring optical-fiber connectors.

There is provided an adapter tip to be employed with an optical-fiber connector endface inspection microscope and an optical-fiber connector endface inspection microscope system suitable for imaging the optical-fiber endface of an angled-polished optical-fiber connector recessed within a connector adapter. The adapter tip or microscope system comprises a relay optical system comprising a Rhomboid prism. The Rhomboid prism being disposed so as to receive light reflected from said optical-fiber endface during inspection and laterally shift the light beam reflected from the angled-polished optical-fiber endface.

In accordance with one aspect, there is provided an adapter tip to be employed with an optical-fiber connector endface inspection microscope for imaging an optical-fiber endface of an angled-polished optical-fiber connector recessed within a connector adapter. The adapter tip comprises:

a housing having a mating interface configured to mechanically engage with the connector adapter for inspecting the optical-fiber endface within the connector adapter; and a relay optical system disposed in said housing and comprising a Rhomboid prism, the Rhomboid prism being disposed so as to receive light reflected from said optical-fiber endface during inspection and laterally shift the light beam reflected from the angled-polished optical-fiber endface, the relay optical system relaying said light beam to an optical axis of the optical-fiber connector endface inspection microscope.

In accordance with one aspect, there is provided an optical-fiber connector endface inspection microscope system for imaging an optical-fiber endface of an angled-polished optical-fiber connector recessed in a connector adapter. The microscope system comprises:

an optical-fiber connector endface inspection microscope; and an adapter tip connectable to the optical-fiber connector endface inspection microscope and comprising:

a housing having a mating interface configured to mechanically engage with the connector adapter for inspecting the optical-fiber endface within the connector adapter; and a relay optical system disposed in said housing and comprising a Rhomboid prism, the Rhomboid prism being disposed so as to receive light reflected from said optical-fiber endface during inspection and laterally shift the light beam reflected from the angled-polished optical-fiber endface, the relay optical system relaying said light beam to an optical axis of the optical-fiber connector endface inspection microscope.

In some embodiments, the Rhomboid prism may laterally shift the light beam reflected from the angled-polished optical-fiber endface towards a direction opposite to the vector rejection of the normal to the optical-fiber endface on the optical-fiber axis of the connector.

In some embodiments, the relay optical system may further comprise at least a first relay lens and a second relay lens, the first relay lens being disposed proximate to the optical-fiber endface so as to receive light reflected from said optical-fiber endface during inspection and the second relay lens being disposed spaced apart from the first relay lens to further relay the light beam to the optical axis of the optical-fiber connector endface inspection microscope.

In some embodiments, the first relay lens may be disposed so as to directly receive light reflected from said optical-fiber endface during inspection and the Rhomboid prism be disposed between said first relay lens and the second relay lens in order to laterally shift the light beam reflected from the optical-fiber endface and relayed by the first relay lens, towards the lens axis of the second relay lens.

In some embodiments, a lens axis of the first relay lens may be aligned to a center of the optical-fiber endface.

In some other embodiments, a lens axis of the first relay lens may be offset to a centerline of the object beam, towards a direction corresponding to the vector rejection of the normal to the optical-fiber endface on the optical-fiber axis of the connector, so as to deviate the light beam reflected from the optical-fiber endface towards the optical-fiber axis of the connector.

In some embodiments, the lens axis of the second relay lens may be offset relative to a center of the optical-fiber endface towards a direction opposite to the vector rejection of the normal to the optical-fiber endface on the optical-fiber axis of the connector, in order to receive the light beam laterally displaced by the Rhomboid prism.

In some embodiments, a lens axis of the first relay lens and the lens axis of the second relay lens may be both parallel to an optical-fiber axis of the connector.

In some embodiments, a lens axis of the objective lens may be parallel to said optical-fiber axis during inspection.

In some embodiments, a lens axis of the objective lens of the optical-fiber connector endface inspection microscope may be offset relative to the lens axis of the second relay lens during inspection.

In some embodiments, the relay optical system may produce an intermediate image plane between the second relay lens and an objective lens of the optical-fiber connector endface inspection microscope.

In some embodiments, the adapter tip may receive illumination light from the optical-fiber connector endface inspection microscope during inspection in order to image the optical-fiber endface and the relay optical system may redirect the illumination light to the optical-fiber endface.

For ease of reading, in the following description, the "optical-fiber connector endface inspection microscope" and the "optical-fiber connector endface inspection microscope system" may be referred to respectively as an "inspection microscope" and an "inspection microscope system". Similarly, the "optical-fiber connector endface" may be referred to as a "connector endface" or simply "endface".

In the present description, the terms "light" and "optical" are used to refer to radiation in any appropriate region of the electromagnetic spectrum. More particularly, the terms "light" and "optical" are not limited to visible light, but can include, for example, the infrared wavelength range. For example, in some embodiments, the illumination source can emit light in the blue region, e.g., at about 470 nm, or any other suitable spectral region within the visible spectrum, the near ultraviolet spectrum or the near infrared spectrum. Those skilled in the art will understand, however, that these wavelength ranges are provided for illustrative purposes only and that the present techniques may operate beyond these ranges.

In this specification, unless otherwise mentioned, word modifiers such as "substantially" and "about" which modify a value, condition, relationship or characteristic of a feature or features of an embodiment, should be understood to mean that the value, condition, relationship or characteristic is defined to within tolerances that are acceptable for proper operation of this embodiment in the context its intended application.

In the present description, and unless stated otherwise, the terms "connected", "coupled" and variants and derivatives thereof refer to any connection or coupling, either direct or indirect, between two or more elements. The connection or coupling between the elements may be mechanical, physical, operational, electrical or a combination thereof.

Further features and advantages of the present invention will become apparent to those of ordinary skill in the art upon reading of the following description, taken in conjunction with the appended drawings.

It will be noted that throughout the drawings, like features are identified by like reference numerals. It should be understood herein that elements of the drawings are not necessarily depicted to scale. Some mechanical or other physical components may also be omitted in order to not encumber the figures.

The following description is provided to gain a comprehensive understanding of the methods, apparatus and/or systems described herein. Various changes, modifications, and equivalents of the methods, apparatuses and/or systems described herein will suggest themselves to those of ordinary skill in the art. Description of well-known functions and structures may be omitted to enhance clarity and conciseness.

Although some features may be described with respect to individual exemplary embodiments, aspects need not be limited thereto such that features from one or more exemplary embodiments may be combinable with other features from one or more exemplary embodiments.

DETAILED DESCRIPTION

Figure 1:
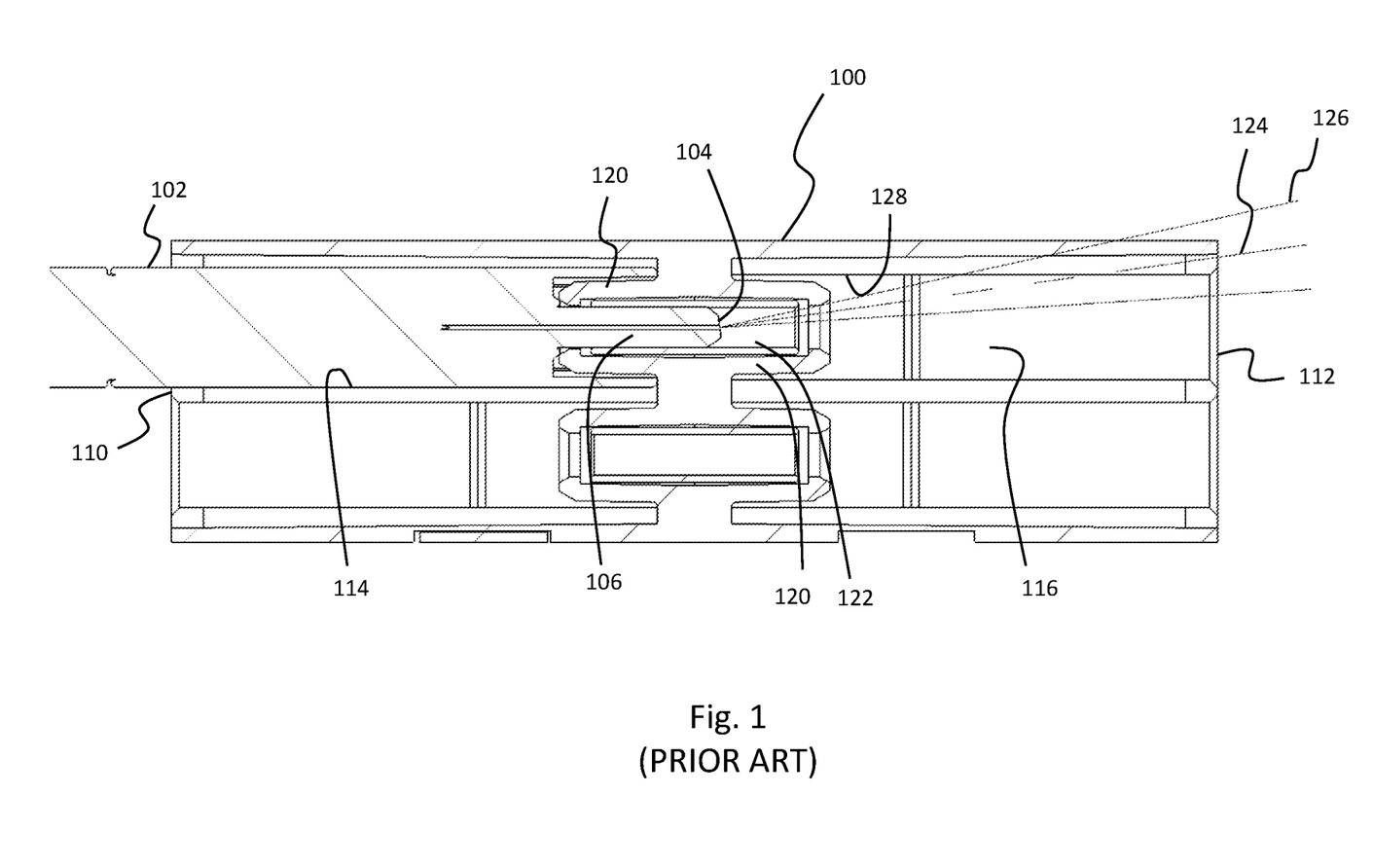
FIG. 1 (PRIOR ART) is a cross-sectional view of angled-polish optical-fiber connector inserted in an optical-fiber connector adapter.

Now referring to the drawings, FIG. 1 shows a cross-sectional view of a connector adapter 100 suitable for interconnecting optical-fiber connectors of connector type known in the industry as MDC-APC connectors. It should be noted that FIG. 1 is simplified such that some elements (notably of the optical-fiber connector) may be omitted in order to emphasize the parts that are relevant to the present description. In some applications, optical-fiber connectors to be inspected using an optical-fiber connector endface inspection microscope are inserted in a connector adapter such as that of connector adapter 100. As known in the art, connector adapters are used to interconnect two optical fibers terminated by optical-fiber connectors such as connector 102. In order for the endfaces 104 of the optical fibers to be brought into close contact, optical-fiber connectors employ fiber-optic ferrules 106 in which the terminated portion of an optical fiber is inserted. The fiber-optic ferrule 106 and optical fiber assembly is polished at the termination, either perpendicularly to the optical fiber axis or at an 8-degree angle in the case of Angled-polished Physical Contact (APC) connectors, so as to form a ferrule endface 104 enclosing, usually in its center, the optical-fiber endface. The connector adapter 100 defines two opposing ends 110, 112 opening to respective connector-receiving channels 114, 116 reaching at a connector interface in the center of the connector adapter 100. It incorporates a mating sleeve 120 defining a ferrule receiving channel 122 in continuity and properly aligned with both connector-receiving channels 114, 116. Two optical-fiber connectors can be interconnected by inserting a first connector via the first end 110 into connector-receiving channel 114 and a second connector (not shown) via the second end 112 into connector-receiving channel 116. In the case of MDC-APC connectors and adapters, angular alignment of the optical-fiber connectors is provided by the somewhat rectangular shape of the connector-receiving channels 114, 116. When the connectors are properly inserted, their respective ferrules 106 tightly fit in opposing ends of the mating sleeve 120, which serves to finely align the ferrules 106 (a single ferrule being actually shown in FIG. 1) so that the terminated optical fibers are aligned and in physical contact.

When inspecting the optical-fiber endface 104 of a connector 102 inserted in a connector adapter 100, the connector 102 to be inspected is generally inserted in the connector adapter 100 via one end 110 and through a connector-receiving channel 114 such that the surface of the optical-fiber endface 104 to be imaged lies at the connector interface recessed within the connector adapter 100. Imaging is therefore performed through the other end 112, i.e. the open end, and the other connector-receiving channel 116. As known in the art, in order to properly image the optical-fiber connector endface 104, the object beam 126 reflected from the endface (through reflection of the illumination light on the connector endface) should be appropriately collected by the inspection microscope objective lens. This typically necessitates that the imaging and illumination axes of the inspection microscope system be aligned perpendicularly to the inspected optical-fiber endface 104. As can be seen in FIG. 1 in which the normal 124 to the angled-polished optical-fiber endface is illustrated, this can become mechanically impractical when inspecting an angled-polished optical-fiber endface 104 that is deeply recessed within long and narrow optical-fiber connector adapter such as that of MDC-APC connector adapter 100. Furthermore, as can be seen in FIG. 1, a substantial proportion of the object beam 126 is obstructed by the inside walls 128 defined by the connector-receiving channel 116, preventing it from being collected by an inspection microscope that would be disposed at open end 112. Hence, the numerical aperture and illumination quality achievable by conventional means is limited.

Now referring to FIGS. 2, 3, 4, 5, 6, 7, 8, 9, there is provided an adapter tip 200 to be employed with an inspection microscope 201 suitable for imaging the optical-fiber endface 104 of an angled-polished optical-fiber connector 102 (see FIG. 7), deeply recessed within a connector adapter 100. The inspection microscope 201 is an inspection microscope 201 adapted to be employed with a variety of interchangeable adapter tips so as to allow inspection of various types of optical-fiber connectors directly or as inserted in an optical-fiber connector adapter. The adapter tip 200 and the inspection microscope 201 together form an inspection microscope system 202.

The most common adapter tips employed for inspecting, e.g., FC/PC or FC/APC connectors are mostly mechanical adapters and therefore do not include any optical elements. Hence, the input lens of the inspection microscope 201 is referred to herein as the "objective lens".

The illustrated embodiment of an adapter tip is suitable for use with a commercially-available optical-fiber inspection microscope 201 and is designed to interface the inspection microscope 201 with MDC-APC connectors inserted in a corresponding connector adapter 100. Although the embodiment described herein is configured to interface with MDC-APC connectors, it should be understood that its mechanical and optical elements may be modified to interface with other types of optical-fiber connectors and connector adapters in which the optical-fiber endface to be imaged is recessed. It can also be used to produce long adapter tips configured to facilitate access of optical-fiber connectors in dense patch-panels. Some non-limiting examples of other connectors and connector adapters presenting a recessed angled optical-fiber endface are E2000/APC, LC-APC and SC-APC connectors inserted in their respective connector adapters.

The adapter tip 200 comprises a housing 204 having a mating interface 206 on its proximal end 208 configured to mechanically engage with the connector adapter 100 and a connection mechanism 210 on its distal end 212 to releasably attach to an inspection microscope 201. The housing 204 defines a light-relaying channel 216 (see FIG. 8) between its proximal end 208 and its distal end 212 to relay the object beam from the optical-fiber endface 104 to the objective lens 226 of the inspection microscope 201.

The mating interface 206 has outer dimensions that are substantially complementary to inner dimensions of a connector-receiving channel 116 (see FIG. 1) of the connector adapter 100 so that it easily inserts into the connector adapter 100 in close proximity with the optical-fiber endface 104 to be inspected, and this without direct contact with the optical-fiber endface 104. Alignment of adapter tip 200 to the optical-fiber connector 102 is at least partly achieved by the small mechanical play of the mating interface 206 within the connector adapter 100.

In one embodiment, the connection mechanism 210 is a screw-threaded mechanism including threads (not shown) on the external surface of the adapter tip 100. The inspection microscope 201 has a corresponding connection mechanism (not shown) comprising a swiveled threaded ring. The adapter tip 200 is attached to the inspection microscope 201 by screwing the threaded ring on the threads of the connection mechanism 210. Of course, other solid and releasable connection mechanisms such as a bayonet connector for example may be used instead.

Figure 9:
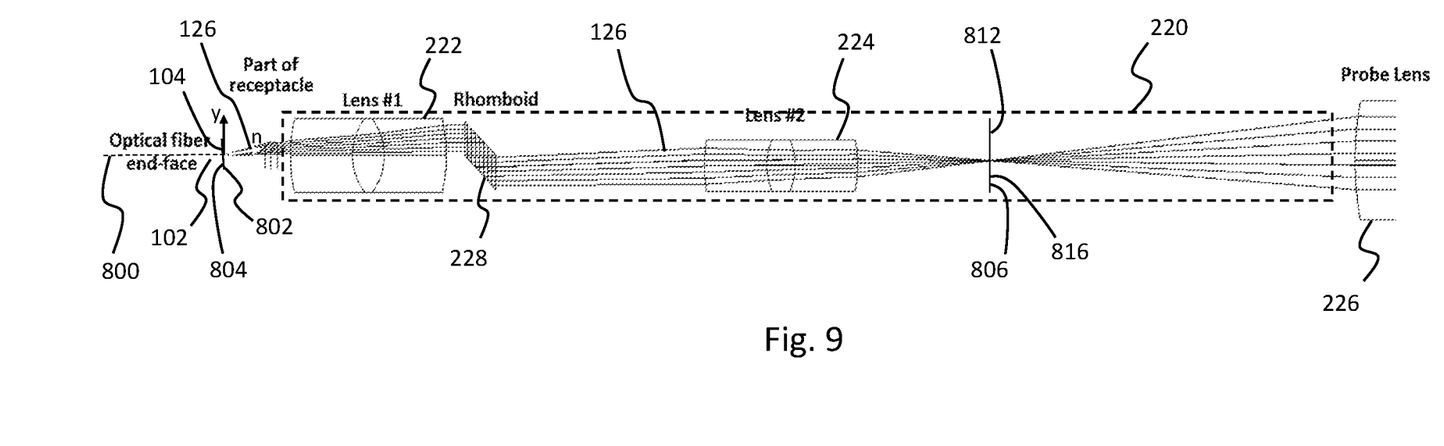
FIG. 9 is a schematic illustrating the relay optical system of the adapter tip of FIG. 3.

As better shown in FIG. 9, the adapter tip 200 comprises a relay optical system 220 disposed within the light relaying channel 216 defined in the housing 204. The relay optical system 220 comprises a first relay lens 222, a second relay lens 224 and a Rhomboid prism 228. The first relay lens 222 is disposed at the proximal end 208 of the adapter tip 200 so as to be adjacent to but in no direct contact with the inspected optical-fiber endface 104 when the adapter tip 200 is inserted in a connector adapter 100, in order to directly receive the object beam reflected from the optical-fiber endface 104 (through reflection of the illumination light). The first relay lens 222 is positioned as close as possible to the proximal end 208 of the adapter tip 200 so as to collect as much of the divergent object beam as possible, although not all light from the light beam reflected on the optical-fiber endface can realistically be collected. The first relay lens 222 is therefore positioned within the connector adapter 100 when the mating interface 206 of the adapter tip 100 is inserted into the connector-receiving channel 116 of the connector adapter 100. The second relay lens 224 is disposed in the light relaying channel 216, spaced apart from the first relay lens 222. The Rhomboid prism 228 is disposed between the first relay lens 222 and the second relay lens 224 in order to laterally shift the light beam reflected from the optical-fiber endfaces and relayed by the first relay lens 222, towards a lens axis of the second relay lens 224.

Rhomboid prisms are known in the art and used to displace a laser beam typically without changing the image orientation. Rhomboid prisms use total internal reflection on two faces typically disposed at 45 degrees relative to the central axis of the incident beam. In the embodiment of FIGS. 2 to 9, the Rhomboid prism 228 shifts the incident beam without angular deviation or orientation change; and the Rhomboid prism 228 shifts the optical centerline of the incident beam by the prism length "L" without inverting the image.

Figure 10:
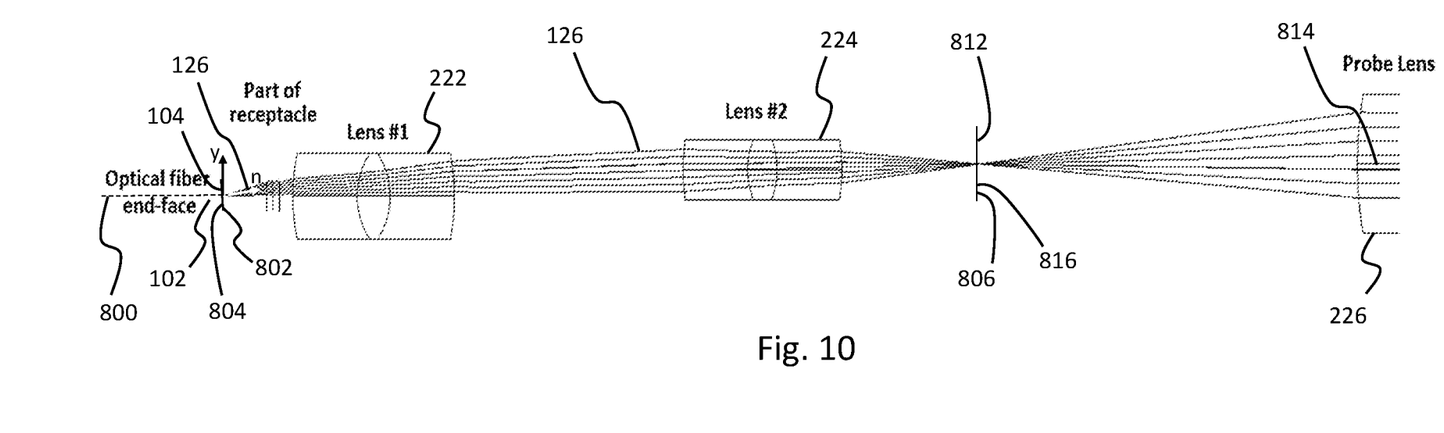
FIG. 10 is a schematic illustrating a hypothetical relay optical system for imaging an angled-polished optical-fiber connector without the use of a Rhomboid prism.

FIG. 10 illustrates a hypothetical relay optical system as could be needed to image the optical fiber endface 104 without the Rhomboid prism 228. In order to collect as much light as possible from the object beam 126, the second lens 224 is positioned laterally offset from the first lens 222 and the objective lens 226 is positioned laterally offset from the second lens 224, further offset from the first lens 222. Depending on the dimension of the first lens 222, it may also be positioned laterally offset from the center of the optical-fiber endface, or not. Such a design in "stairs" can be problematic because the adapter tip is no linear, which can make the tip interfere with adjacent optical-fiber connectors in a tested patch panel.

The object 804 to be imaged, i.e., the optical-fiber endface 104, lies in a real object plane 802, to within a focusing range of the inspection microscope 201. The relay optical system reproduces the real object 804 that lies in the real object plane 802 on an intermediate image plane 806 that may be slightly tilted relative to the real object plane 802 towards a plane orthogonal to the optical-fiber axis 800, so as to reduce the angle between the normal n of the intermediate image plane 802 and the optical-fiber axis 800 of the connector 102. In order to do so, the lens axis of the first relay lens 222 can be made slightly offset relative to the optical-fiber endface 104. It is slightly offset towards the direction corresponding to the rejection y of the normal n to the optical-fiber endface 104 on the optical-fiber axis 800. Similarly, the lens axis of the second relay lens 224 is also slightly offset relative to the center of relay lens 222 so that it is not aligned therewith. There results an intermediate image 812 lying in the intermediate image plane 806 between relay lens 224 and the objective lens 226, and which is tilted relative to the real object 804 towards a plane orthogonal to the optical-fiber axis 800 and slightly offset along the y-axis relative to the real object 804.

As such, the normal n to the inspected optical-fiber endface 104, and hence of the real object plane 802, forms an 8° angle relative to the imaging and illumination axis of the inspection microscope 201.

The objective lens 226 is disposed such that the intermediate image plane 806 substantially lies on the original object plane 816 of the inspection microscope 201 (without the adapter tip 200) to within its focusing range. As such, the lens axis 814 of the objective lens 226 (also referred to herein as the imaging and illumination axis 814 of the inspection microscope 201) is also slightly offset along the y-axis relative to the lens axis of the second relay lens 224.

Now back to FIG. 9, the relay optical system 220 of FIG. 9 is the same as that shown and described with reference to FIG. 10, except for the added Rhomboid prism 228 along the optical path, which laterally shifts the object beam 126 in the opposite direction of the offsets, i.e. towards a direction opposite to the rejection y of the normal n to the optical-fiber endface on the optical-fiber axis of the connector, in order to make the tip more linear and cross-sectionally compact so that is does not mechanically interfere with adjacent optical-fiber connectors in a patch panel. Advantageously, the Rhomboid prism 228 does not substantially impact the quality of the image captured by the inspection microscope. For better image quality, the Rhomboid prism 228 may optionally be positioned so that its input and output faces are not perfectly perpendicular to the centerline of the object beam so as to avoid parasite reflections toward the image sensor of the inspection microscope 201.

The first relay lens 222, the Rhomboid prism 228 and the second relay lens 224 cooperate to together propagate the object beam 126 close to the optical-fiber axis 800 of the connector 102, in a cross-sectionally compact optical design. The first relay lens 222, the second relay lens 224, the Rhomboid prism 228 and the objective lens 226 define an optical system.

In the embodiment of FIG. 9, the optical axes of both relay lenses 222, 224 are parallel to the optical-fiber axis 800, and therefore not normal to the inspected endface (there is an 8° angle between the normal n to the optical-fiber endface and the optical-fiber axis). The optical axis of the objective lens 226 is also made parallel to the optical axes of both relay lenses 222, 224 and the optical-fiber axis 800. The lenses are therefore disposed such that their optical axes are all parallel (including the objective lens 226), which makes the adapter tip 200 much easier to manufacture with good precision in the relative orientations of the relay lenses 222, 224 and the objective lens 226.

As exemplified in FIG. 9, in the relay optical system 220 the centerline of the object beam 126 is deviated by the first relay lens 222 and then further deviated by the second relay lens 224.

In the embodiment of FIG. 9, the relay lenses 222 and 224 may optionally consist of compound lenses in order to provide low distortion and good off-axis performance. For example, relay lenses 222 and 224 may each comprise an achromatic triplet lens made of a symmetric double convex lens element cemented between two identical negative meniscus lens elements having a refractive index higher than that of the convex lens element. The achromatic triplet lenses may be optimized for minimizing off-axis aberrations when employed with an infinite conjugate ratio, i.e., when focusing on infinity an object point placed at focal distance.

In one embodiment, relay lenses 222 and 224 may consist of a Hasting triplet lens. By design, Hasting triplet lenses are optimized for an infinite conjugate ratio. Relay lens 222 is then disposed such that its focal point lies nearly on the real object plane 802. Similarly, relay lens 224 is disposed relative to the objective lens 226 such that its focal point lies nearly on the original object plane 816 defined by the inspection microscope 201.

It is noted that the use of such triplet lenses is optional and that simple lenses may also be found perfectly suitable for some embodiments, depending on the specific design and practical application.

It will be understood that the specific design of the adapter tip may be varied depending on the specific optical requirements, the specific application and the design of the specific inspection microscope. For example, although the adapter tip 200 of the embodiment of FIGS. 2 to 9 is designed for inspecting MDC-APC connectors, other embodiments may include adapter tips designed for inspecting other types of connectors, including some future connectors not even yet commercially available.

For example, in such other embodiments, the relay lenses may be more simple or more complex, be made aspheric or include additional optical components as may be rendered necessary by the specific design or practical application. Other components may also be included along the optical axis within the adapter tip, e.g., to improve its optical performance, such as, e.g., aberration compensation element(s).

Furthermore, the number of relay lenses may vary. Adapter tip configurations including zero, one or more relay lenses are all envisaged.

Figure 11:
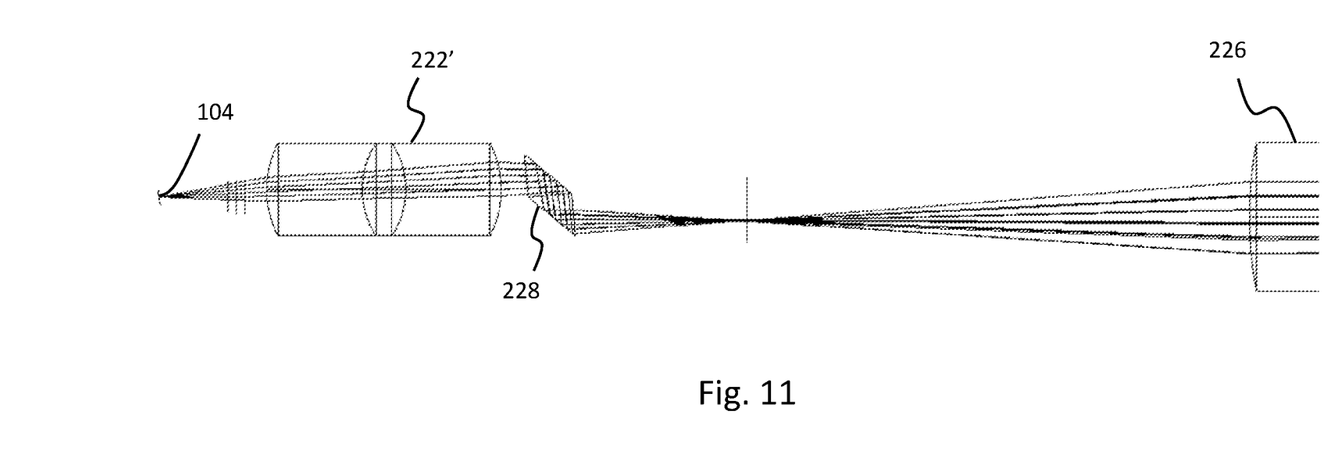
FIG. 11 is a schematic illustrating the relay optical system of an adapter tip in accordance with another embodiment in which the adapter tip comprises a single relay lens.

For example, FIG. 11 shows an optical configuration in accordance with an embodiment in which the adapter tip comprises a single relay lens 222' and a Rhomboid prism 228. In this embodiment, the relay lens 222' may consists, e.g., of a Hasting triplet lens and the lens parameters such as the focal length may need to vary from those of FIG. 9.

Figure 12:
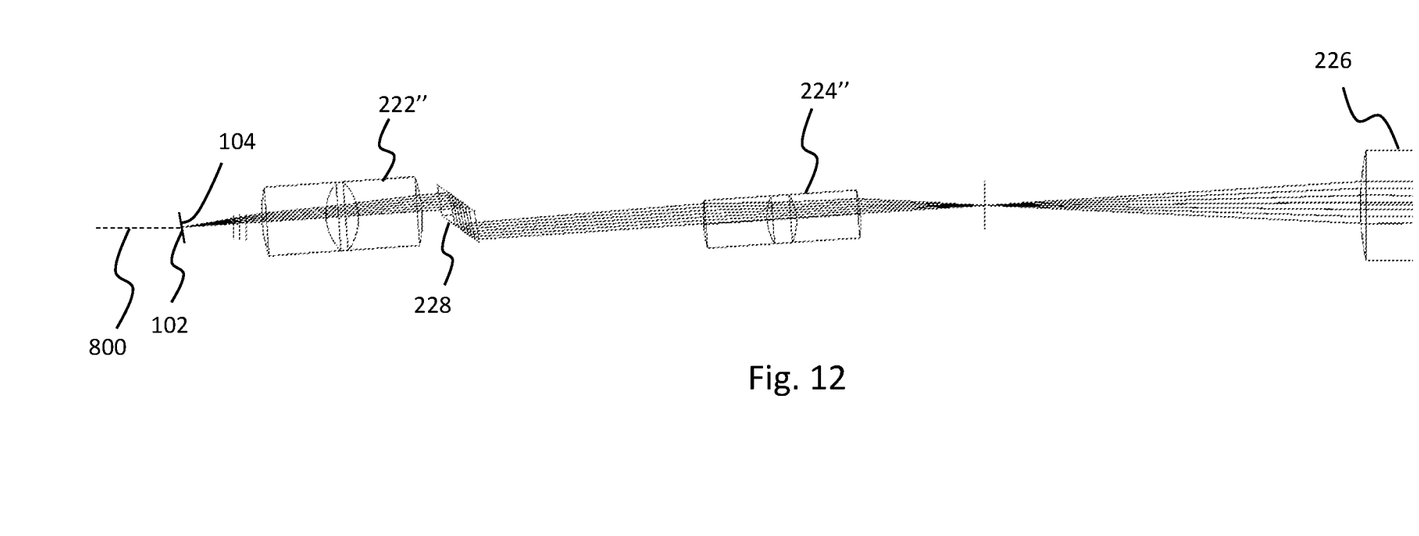
FIG. 12 is a schematic illustrating the relay optical system of an adapter tip in accordance with yet another embodiment in which optical axes are not parallel.

Referring to FIG. 12, it should be appreciated that although in the configuration of FIGS. 2 to 9 the lens axis of each relay lenses 222, 224 and that of the objective lens 226 are all parallel to the optical-fiber axis 800 of the optical-fiber connector 102, other optical configurations in which some or all optical axes are not parallel are also envisaged and may offer at least equivalent optical performance with a small practical drawback on ease of manufacturing. FIG. 12 shows an optical configuration in accordance with such another embodiment wherein respective optical axes of relay lenses 222", 224" are not parallel to the optical-fiber axis 800 of the optical-fiber connector 102. In the illustrated case, the lens axis of the objective lens 226 is parallel to the optical-fiber axis 800 but in other embodiments, it could be made unparallel as well. Of course, the mechanical configuration of the adapter tip may need to be adapted to implement such optical configuration.

Figure 2:
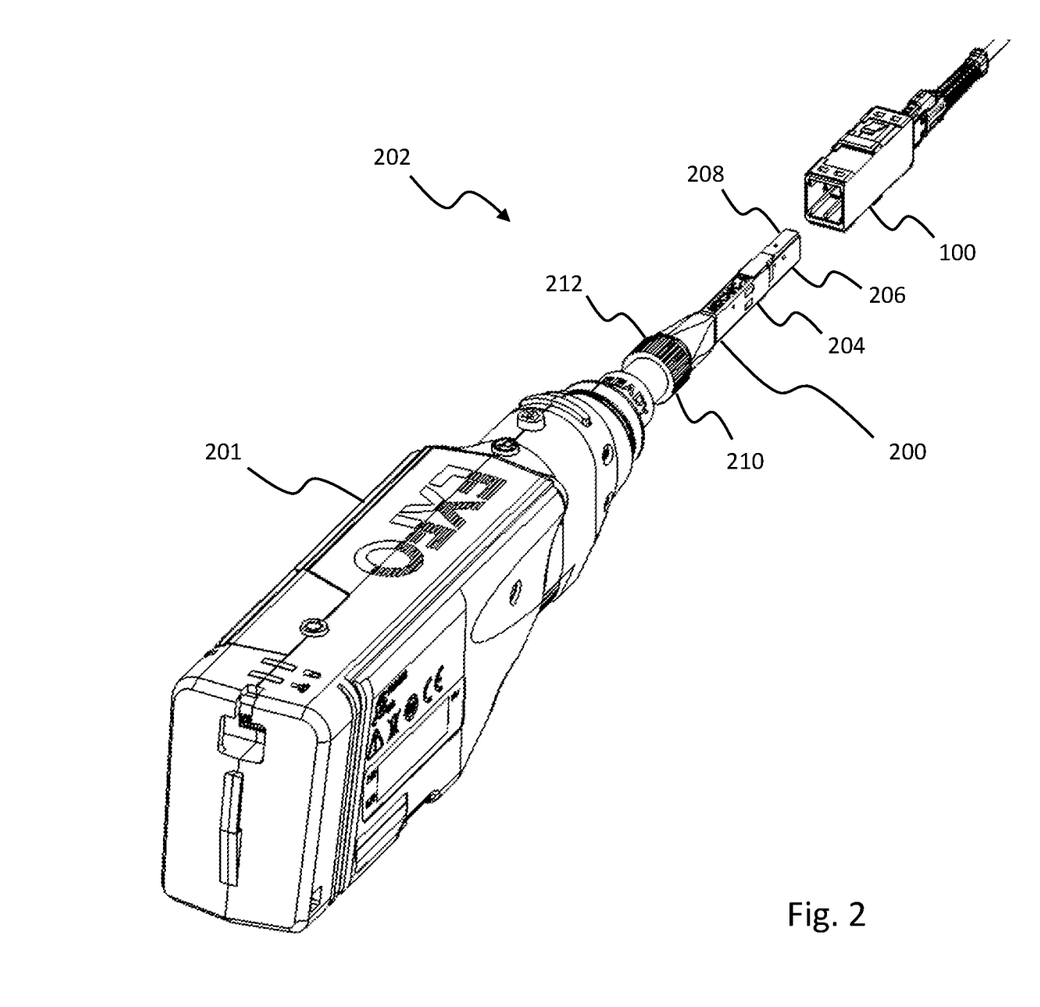
FIG. 2 is a back-perspective view of an optical-fiber connector endface inspection microscope coupled to an adapter tip for imaging an optical-fiber endface of an angled-polished optical-fiber connector recessed within a connecter adapter, in accordance with one embodiment.
Figure 3:
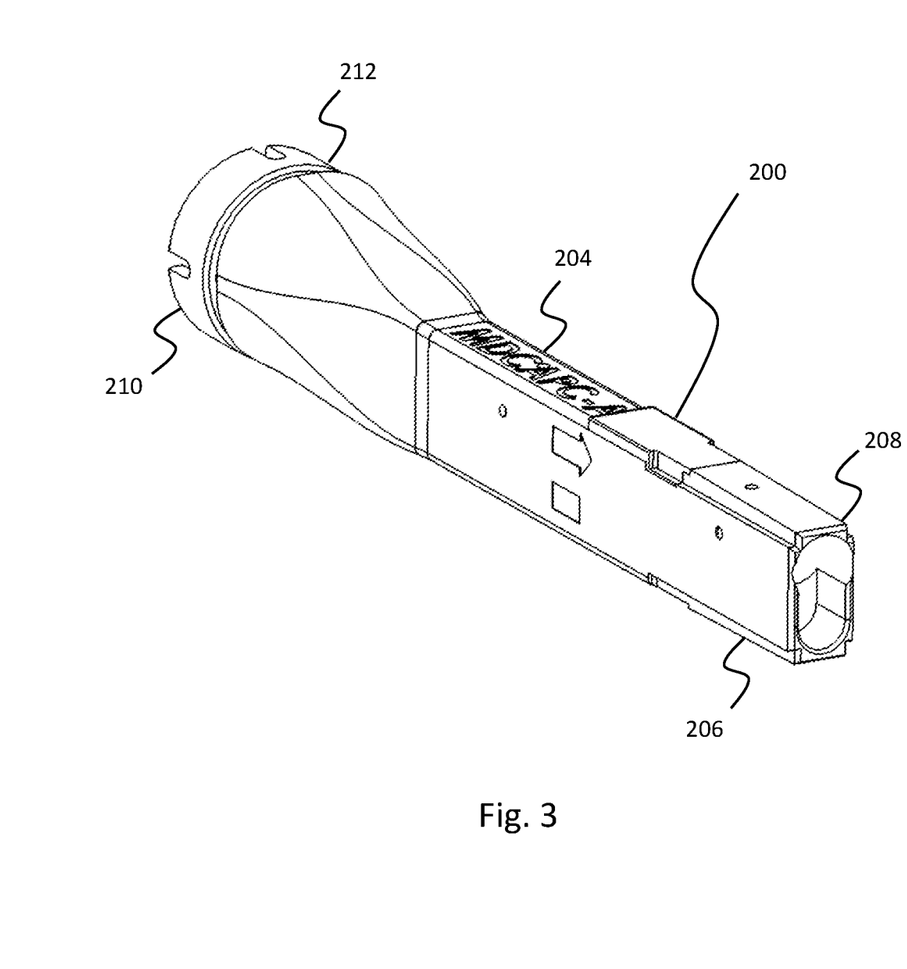
FIG. 3 is a front-left isometric view of an adapter tip in accordance with one embodiment.
Figure 4:
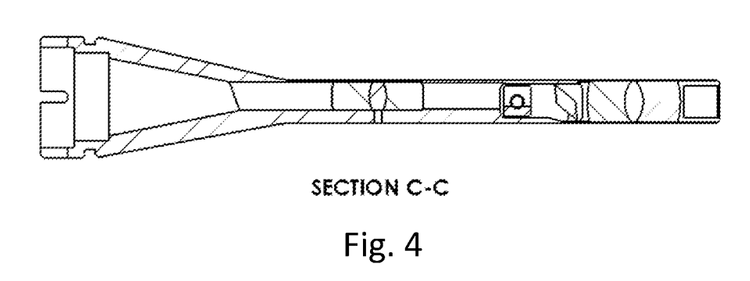
FIG. 4 is a cross-sectional view of the adapter tip of FIG. 3 taken along line C-C of FIG. 6.
Figure 5:
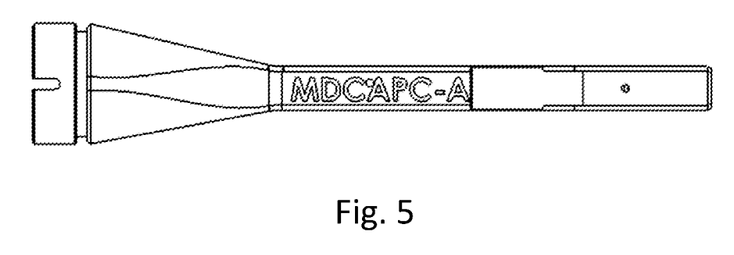
FIG. 5 is a top plan view of the adapter tip of FIG. 3.
Figure 6:
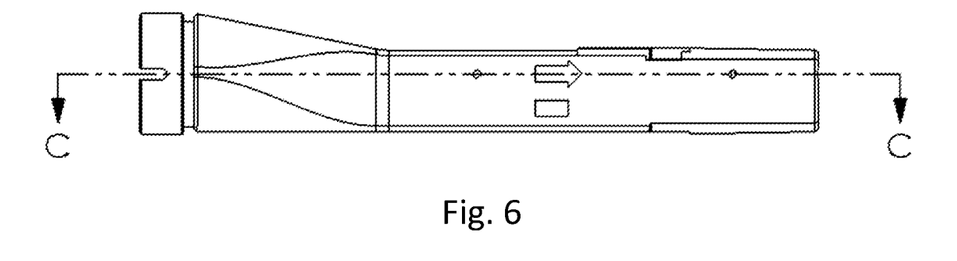
FIG. 6 is a left-side elevation view of the adapter tip of FIG. 3.
Figure 7:
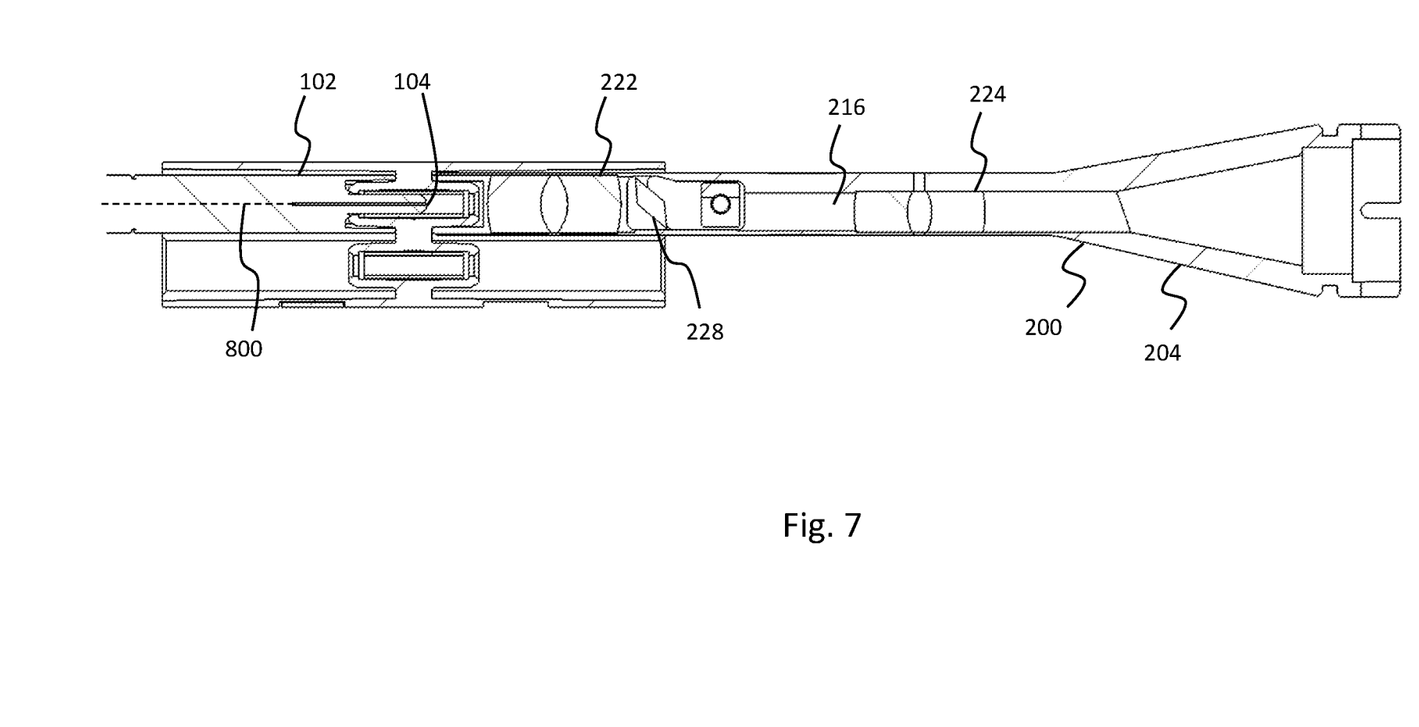
FIG. 7 is a cross-sectional view of the adapter tip of FIG. 3 taken along line C-C of FIG. 6 and shown as inserted within a connector adapter for imaging an optical-fiber endface of an angled-polished optical-fiber connector recessed within the connecter adapter.
Figure 8:
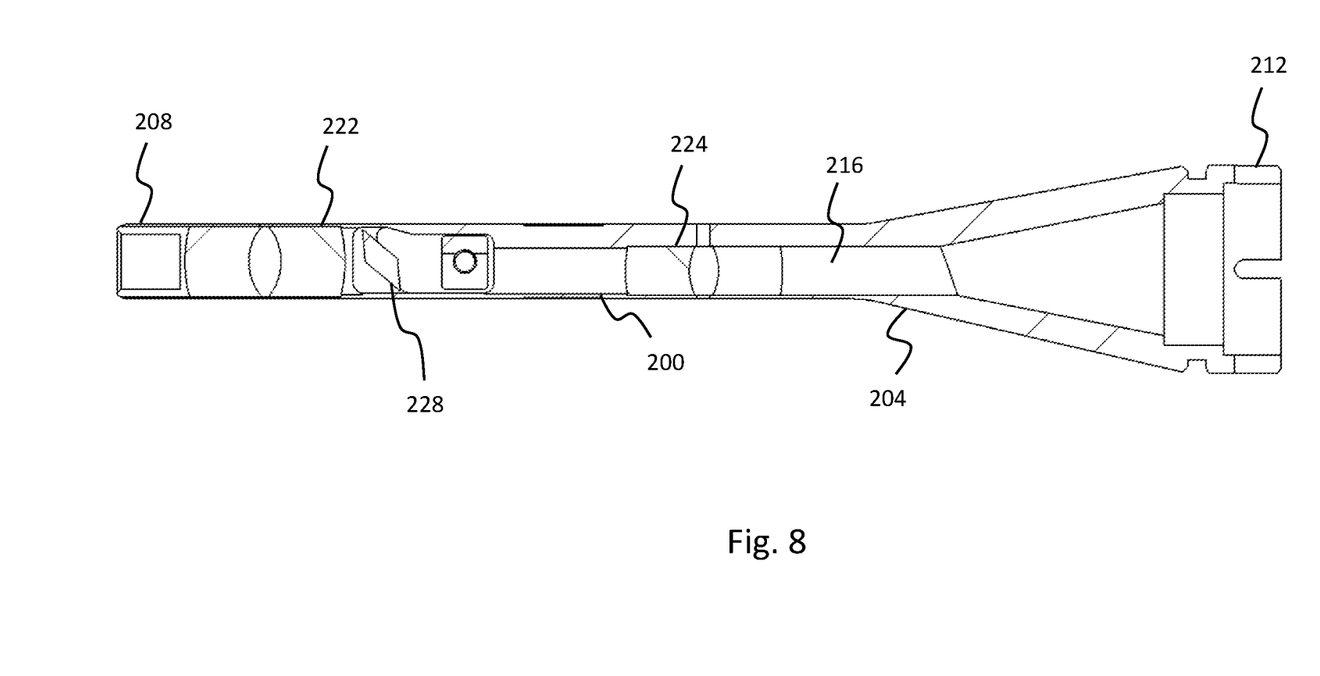
FIG. 8 is a cross-sectional view of the adapter tip of FIG. 3 only taken along line C-C of FIG. 6.
Figure 13:
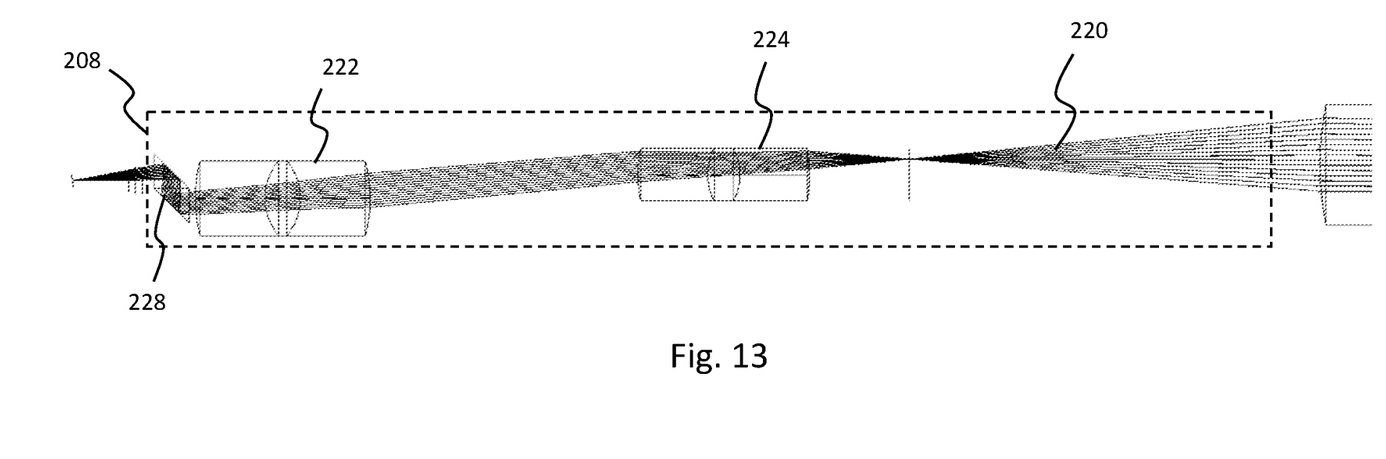
FIG. 13 is a schematic illustrating the relay optical system of an adapter tip in accordance with yet another embodiment in which the Rhomboid prism is positioned close to the proximal end of the adapter tip.
Figure 14:
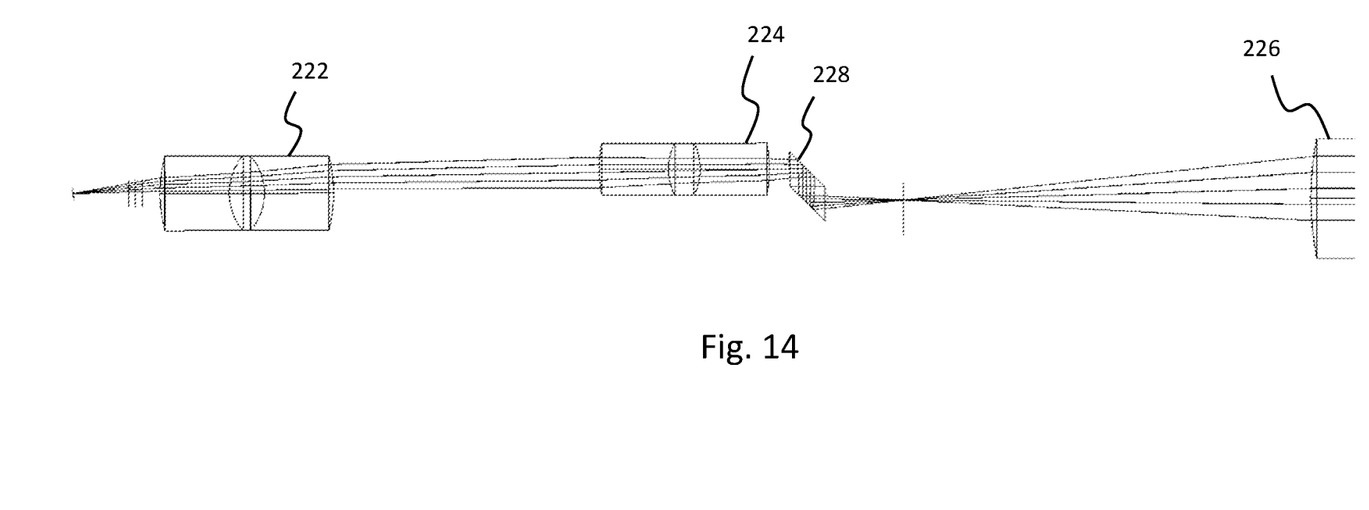
FIG. 14 is a schematic illustrating the relay optical system of an adapter tip in accordance with yet another embodiment in which the Rhomboid prism is positioned between the second relay lens and the objective lens of the inspection microscope.

Referring to FIGS. 13 and 14, it should be noted that, although in the embodiment of FIGS. 2 to. 9, the Rhomboid prism 228 is disposed between the first relay lens 222 and the second relay lens 224, the position of the Rhomboid prism 228 may vary. For example, in some other embodiments including that of FIG. 13, the Rhomboid prism 228 may rather be positioned close to the proximal end 208 of the adapter tip to relay the divergent object beam to the first relay lens 222, i.e., between the inspected optical-fiber endface 104 and the first relay lens 222. In yet other embodiments including that of FIG. 14, the Rhomboid prism 228 may rather be positioned between the second relay lens 224 and the objective lens 226 of the inspection microscope.

Figure 15:
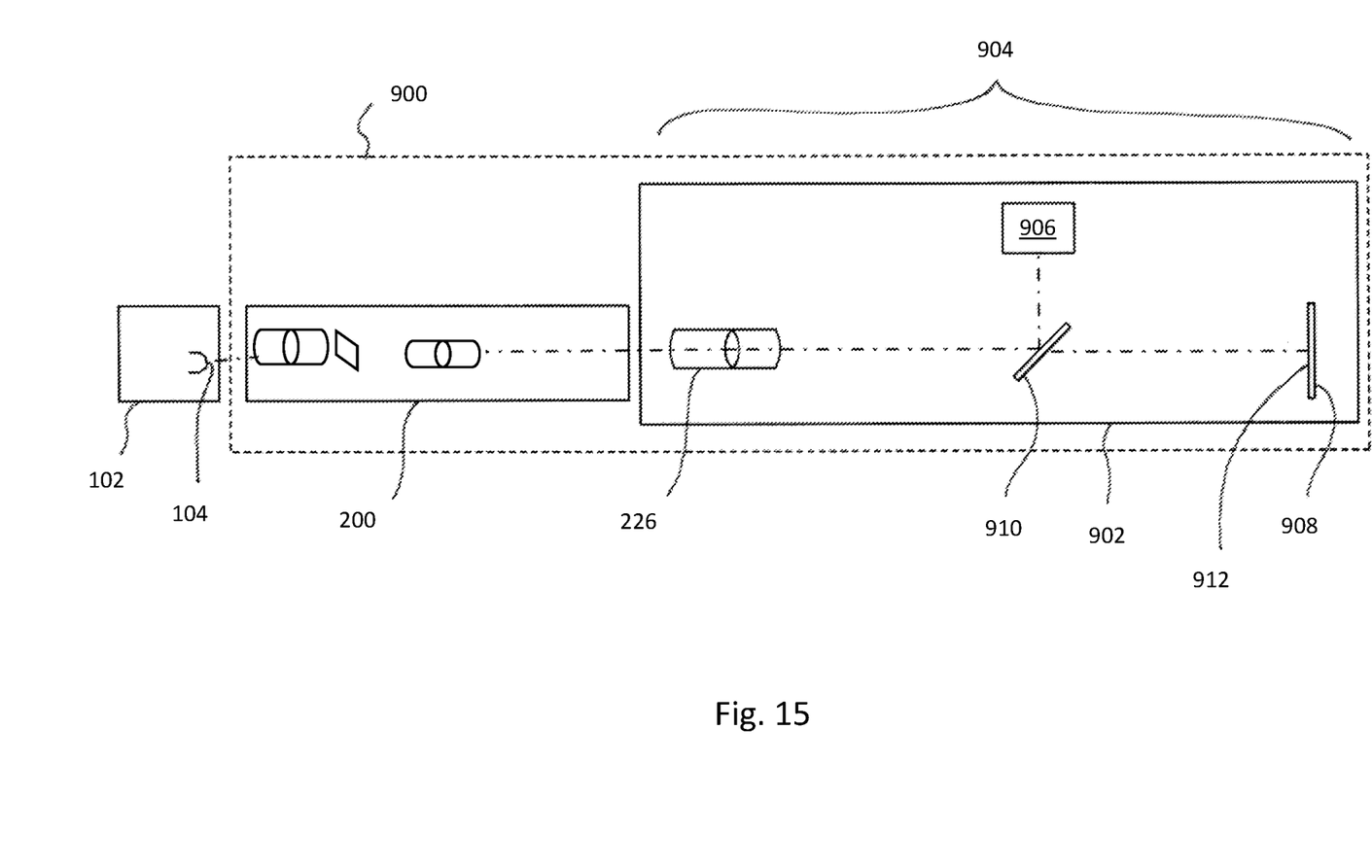
FIG. 15 is a block diagram illustrating an optical-fiber inspection microscope system comprising the adapter tip of FIG. 3, in accordance with one embodiment.

FIG. 15 illustrates an inspection microscope system 900 which employs an adapter tip 200 as described herein. The inspection microscope system 900 comprises a combination of an inspection microscope 902 and an adapter tip 200. The inspection microscope system of FIG. 15 is illustrated with the adapter tip 200 of FIGS. 2 to 9 but it will be understood that it is designed for use with interchangeable tips and that the adapter tip can be replaced with any other embodiment of adapter tips described herein.

As known in the art, the inspection microscope 902 at least contains an optical-fiber endface imaging assembly 904 comprising an illumination source 906, an objective lens 226, an image sensor 908 and a beam splitter 910. The illumination source 906 illuminates the optical-fiber endface 104 and can be embodied in a light-emitting diode (LED) typically emitting in the blue wavelength region. The objective lens 226 directs the illumination light on the optical-fiber endface 104 to be imaged and collects light returned from the optical-fiber endface 104 through reflection of the illumination light in order to image the optical-fiber endface 104 on the image sensor 908 positioned on an image plane 912. The image sensor 908 may be embodied in a complementary metal-oxide-semiconductor (CMOS) sensor or a charge-coupled device (CCD), for instance. The beam splitter 910, e.g., a 50/50 beam splitter, is located between the objective lens 226 and the image sensor 908. It both directs the illumination light towards the objective lens 226 for illuminating the optical-fiber endface 104 and propagates the returned object beam 126 from the objective lens 226 to the image sensor 908.

It will be understood that other components may be included in the inspection microscope 902 such as, e.g., aberration compensation optical element(s).

Figures 16A, 16B, 16C:
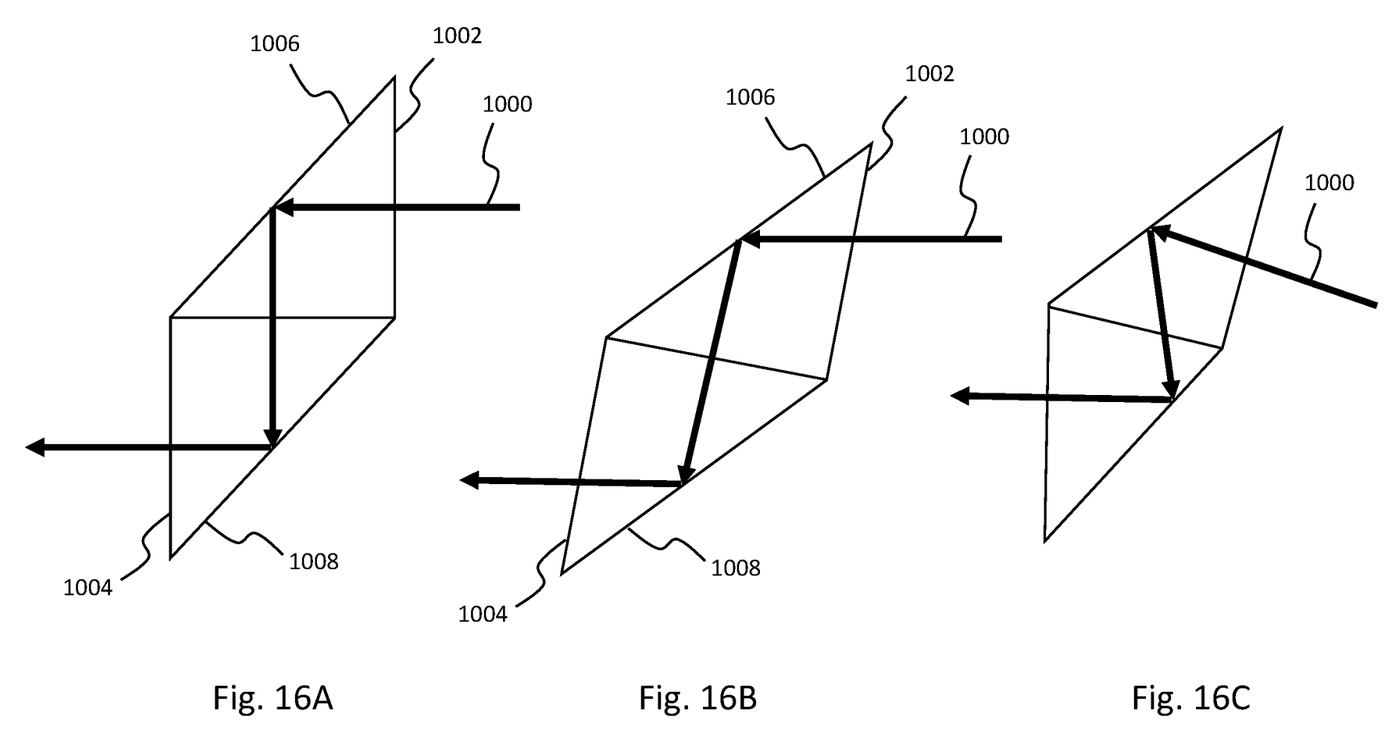
FIG. 16A is a schematic illustrating an optical configuration of a Rhomboid prism in accordance with one embodiment wherein the Rhomboid prism is oriented so that its input and output faces are perpendicular to the centerline of the object beam.
FIG. 16B is a schematic illustrating an optical configuration of a Rhomboid prism in accordance with another embodiment wherein the Rhomboid prism is slightly tilted relative to the centerline of the object beam.
FIG. 16C is a schematic illustrating an optical configuration of a Rhomboid prism in accordance with another embodiment wherein opposite reflection faces of the Rhomboid prism are non-parallel.

Referring to FIGS. 16A, 16B and 16C, depending on the specific design, the orientation of the Rhomboid prism 228 may vary relative to the centerline 1000 of the object beam. In both FIG. 16A and FIG. 16B, the reflection faces 1006, 1008 of the Rhomboid prism are disposed at 45 degrees relative to the input and output faces 1002, 1004. As shown in FIG. 16A, the Rhomboid prism can be oriented so that its input and output faces 1002, 1004 are perpendicular to the centerline 1000 or, as shown in FIG. 16B, it can be slightly tilted so that the centerline 1000 is not perpendicular to the input and output faces 1002, 1004. Furthermore, as shown in FIG. 16C, opposite reflection faces of the Rhomboid prism can even be made non-parallel, so as to angularly deviate the incident beam in addition to the shift.

Figure 17:
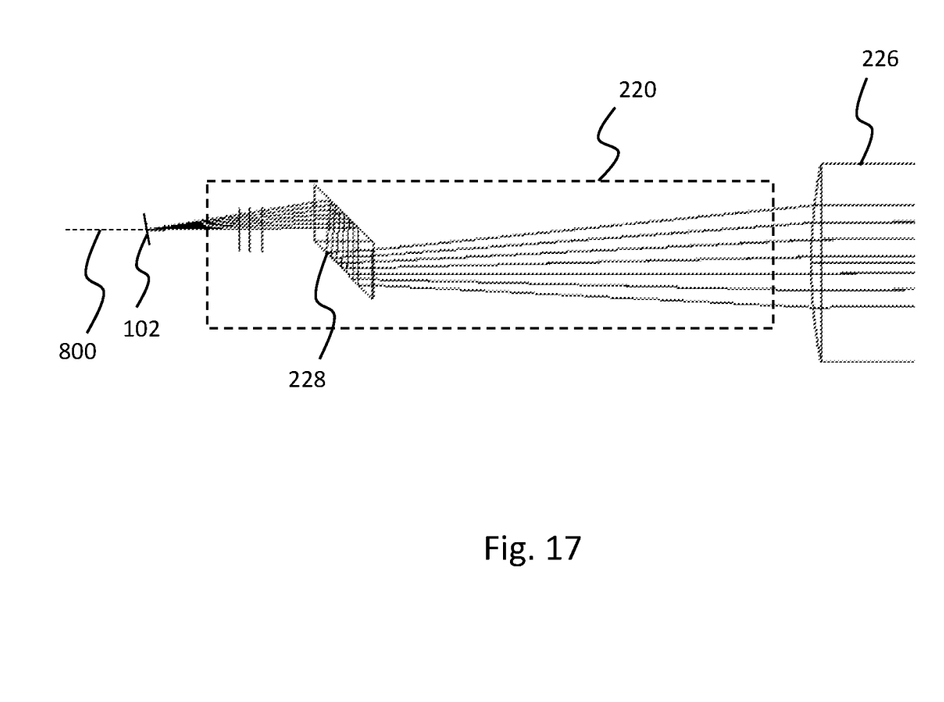
FIG. 17 is a schematic illustrating the relay optical system of an adapter tip in accordance with yet another embodiment in which the Rhomboid prism has non-parallel opposite reflection faces.

FIG. 17 illustrates an example application of such an irregular Rhomboid prism having non-parallel opposite reflection faces. In this embodiment, the relay optical system of the adapter tip has no relay lens and comprises only a Rhomboid prism. The Rhomboid prism is used to angularly deviate the centerline of the object beam towards the optical-fiber axis 800 so as to relay the light beam towards the objective lens 226 of the inspection microscope. With such configuration, an angled-polished optical-fiber connector 102 can be inspected with a straight adapter tip wherein the lens axis of the objective lens 226 can be made parallel to the optical-fiber axis 800. In the embodiment illustrated in FIG. 17, the reflection faces of the Rhomboid prism are slightly non-parallel with an angle of a few degrees with respect to one another.

The embodiments described above are intended to be exemplary only. The scope of the invention is therefore intended to be limited solely by the appended claims.

The invention claimed is:

1. An adapter tip to be employed with an optical-fiber connector endface inspection microscope for imaging an optical-fiber endface of an angled-polished optical-fiber connector recessed within a connector adapter, the adapter tip comprising:
   a housing having a mating interface configured to mechanically engage with the connector adapter for inspecting the optical-fiber endface within the connector adapter; and
   a relay optical system disposed in said housing and comprising a Rhomboid prism, the Rhomboid prism being disposed so as to receive light reflected from said optical-fiber endface during inspection and laterally shift the light beam reflected from the angled-polished optical-fiber endface, the relay optical system relaying said light beam to an optical axis of the optical-fiber connector endface inspection microscope.

2. The adapter tip as claimed in claim 1, wherein the Rhomboid prism laterally shifts the light beam reflected from the angled-polished optical-fiber endface towards a direction opposite to the vector rejection of the normal to the optical-fiber endface on the optical-fiber axis of the connector.

3. The adapter tip as claimed in claim 2, wherein said relay optical system further comprises at least a first relay lens and a second relay lens, the first relay lens being disposed proximate to the optical-fiber endface so as to receive light reflected from said optical-fiber endface during inspection and the second relay lens being disposed spaced apart from the first relay lens to further relay the light beam to the optical axis of the optical-fiber connector endface inspection microscope.

4. The adapter tip as claimed in claim 3, wherein the first relay lens is disposed so as to directly receive light reflected from said optical-fiber endface during inspection and the Rhomboid prism is disposed between said first relay lens and said second relay lens in order to laterally shift the light beam reflected from the optical-fiber endface and relayed by the first relay lens, towards the lens axis of the second relay lens.

5. The adapter tip as claimed in claim 3, wherein a lens axis of said first relay lens is aligned to a center of the optical-fiber endface.

6. The adapter tip as claimed in claim 3, wherein a lens axis of said first relay lens is offset to a centerline of the object beam, towards a direction corresponding to the vector rejection of the normal to the optical-fiber endface on the optical-fiber axis of the connector, so as to deviate the light beam reflected from the optical-fiber endface towards the optical-fiber axis of the connector.

7. The adapter tip as claimed in claim 6, wherein the lens axis of the second relay lens is offset relative to a center of the optical-fiber endface towards a direction opposite to the vector rejection of the normal to the optical-fiber endface on the optical-fiber axis of the connector, in order to receive the light beam laterally displaced by the Rhomboid prism.

8. The adapter tip as claimed in claim 7, wherein a lens axis of said first relay lens and the lens axis of the second relay lens are both parallel to an optical-fiber axis of the connector.

9. The adapter tip as claimed in claim 8, wherein said optical-fiber connector endface inspection microscope comprises an objective lens and wherein the lens axis of said objective lens is parallel to said optical-fiber axis during inspection.

10. The adapter tip as claimed in claim 9, wherein a lens axis of the objective lens of the optical-fiber connector endface inspection microscope is offset relative to the lens axis of the second relay lens during inspection.

11. The adapter tip as claimed in claim 3, wherein said relay optical system produces an intermediate image plane between said second relay lens and an objective lens of the optical-fiber connector endface inspection microscope.

12. The adapter tip as claimed in claim 1, wherein said adapter tip receives illumination light from the optical-fiber connector endface inspection microscope during inspection in order to image the optical-fiber endface and wherein said relay optical system redirects the illumination light to the optical-fiber endface.

13. An optical-fiber connector endface inspection microscope system for imaging an optical-fiber endface of an angled-polished optical-fiber connector recessed in a connector adapter, the microscope system comprising:
  an optical-fiber connector endface inspection microscope; and
  an adapter tip connectable to the optical-fiber connector endface inspection microscope and comprising:
    a housing having a mating interface configured to mechanically engage with the connector adapter for inspecting the optical-fiber endface within the connector adapter; and
    a relay optical system disposed in said housing and comprising a Rhomboid prism, the Rhomboid prism being disposed so as to receive light reflected from said optical-fiber endface during inspection and laterally shift the light beam reflected from the angled-polished optical-fiber endface, the relay optical system relaying said light beam to an optical axis of the optical-fiber connector endface inspection microscope.

14. The optical-fiber connector endface inspection microscope system as claimed in claim 13, wherein the Rhomboid prism laterally shifts the light beam reflected from the angled-polished optical-fiber endface towards a direction opposite to the vector rejection of the normal to the optical-fiber endface on the optical-fiber axis of the connector.

15. The optical-fiber connector endface inspection microscope system as claimed in claim 14, wherein said relay optical system further comprises at least a first relay lens and a second relay lens, the first relay lens being disposed proximate to the optical-fiber endface so as to receive light reflected from said optical-fiber endface during inspection and the second relay lens being disposed spaced apart from the first relay lens to further relay the light beam to the optical axis of the optical-fiber connector endface inspection microscope.

16. The optical-fiber connector endface inspection microscope system as claimed in claim 15, wherein the first relay lens is disposed so as to directly receive light reflected from said optical-fiber endface during inspection and the Rhomboid prism is disposed between said first relay lens and said second relay lens in order to laterally shift the light beam reflected from the optical-fiber endface and relayed by the first relay lens, towards the lens axis of the second relay lens.

17. The optical-fiber connector endface inspection microscope system as claimed in claim 15, wherein a lens axis of said first relay lens is offset to a centerline of the object beam, towards a direction corresponding to the vector rejection of the normal to the optical-fiber endface on the optical-fiber axis of the connector, so as to deviate the light beam reflected from the optical-fiber endface towards the optical-fiber axis of the connector.

18. The optical-fiber connector endface inspection microscope system as claimed in claim 17, wherein the lens axis of the second relay lens is offset relative to a center of the optical-fiber endface towards a direction opposite to the vector rejection of the normal to the optical-fiber endface on the optical-fiber axis of the connector, in order to receive the light beam laterally displaced by the Rhomboid prism.

19. The optical-fiber connector endface inspection microscope system as claimed in claim 18, wherein a lens axis of said first relay lens and the lens axis of the second relay lens are both parallel to an optical-fiber axis of the connector.

20. The optical-fiber connector endface inspection microscope system as claimed in claim 19, wherein said optical-fiber connector endface inspection microscope comprises an objective lens and wherein the lens axis of said objective lens is parallel to said optical-fiber axis during inspection.

* * * * *